United States Patent
Cho

(10) Patent No.: US 10,552,545 B2
(45) Date of Patent: Feb. 4, 2020

(54) MATHEMATICAL TRANSLATOR, A MATHEMATICAL TRANSLATION DEVICE AND A MATHEMATICAL TRANSLATION PLATFORM

(71) Applicant: Bong Han Cho, Seoul (KR)

(72) Inventor: Bong Han Cho, Seoul (KR)

( * ) Notice: Subject to any disclaimer, the term of this patent is extended or adjusted under 35 U.S.C. 154(b) by 0 days.

(21) Appl. No.: 15/717,905

(22) Filed: Sep. 27, 2017

(65) Prior Publication Data

US 2018/0089177 A1 Mar. 29, 2018

(30) Foreign Application Priority Data

Sep. 29, 2016 (KR) .................. 10-2016-0125885

(51) Int. Cl.
| | |
|---|---|
| G06F 17/28 | (2006.01) |
| G06F 17/27 | (2006.01) |
| G06F 16/33 | (2019.01) |
| G06F 17/12 | (2006.01) |

(52) U.S. Cl.
CPC ........ *G06F 17/289* (2013.01); *G06F 16/3344* (2019.01); *G06F 17/2785* (2013.01); *G06F 17/12* (2013.01)

(58) Field of Classification Search
None
See application file for complete search history.

(56) References Cited

U.S. PATENT DOCUMENTS

| 7,373,291 | B2* | 5/2008 | Garst | ............... G06K 9/72 704/10 |
| 2004/0015342 | A1* | 1/2004 | Garst | ............... G06K 9/72 704/5 |
| 2009/0019015 | A1* | 1/2009 | Hijikata | ........... G06F 16/951 |
| 2012/0042242 | A1* | 2/2012 | Garland | ............ G06F 17/215 715/256 |
| 2013/0024487 | A1* | 1/2013 | Yi | ............... G06F 17/215 708/136 |
| 2013/0262080 | A1* | 10/2013 | Marciano | ........ G06F 17/2836 704/3 |
| 2013/0290391 | A1* | 10/2013 | Kamitani | ............ G06F 15/02 708/168 |

(Continued)

FOREIGN PATENT DOCUMENTS

| KR | 101469715 B1 | 12/2014 |
| KR | 101567904 B1 | 11/2015 |

OTHER PUBLICATIONS

Wongkia, Wararat, Kanlaya Naruedomkul, and Nick Cercone. "i-Math: Automatic math reader for Thai blind and visually impaired students." Computers & Mathematics with Applications 64.6 (2012): 2128-2140. (Year: 2012).*

(Continued)

*Primary Examiner* — Jonathan C Kim
(74) *Attorney, Agent, or Firm* — Sughrue Mion, PLLC

(57) ABSTRACT

The present invention relates to a mathematical translator, a mathematical translation device and a mathematical translation platform, which especially allows a user to understand principle of mathematics of its own accord and express the principle in words by interpreting the meaning of the mathematical expression in a natural language when the specific mathematical expression is inputted.

10 Claims, 8 Drawing Sheets

(56) References Cited

U.S. PATENT DOCUMENTS

| | | | | |
|---|---|---|---|---|
| 2014/0039878 | A1* | 2/2014 | Wasson | G06F 17/28 |
| | | | | 704/9 |
| 2015/0363390 | A1* | 12/2015 | Mungi | G06F 17/271 |
| | | | | 704/9 |
| 2017/0046139 | A1* | 2/2017 | Yi | G06F 17/271 |
| 2017/0220543 | A1* | 8/2017 | Canton | G06F 17/246 |

OTHER PUBLICATIONS

Wongkia, Wararat, Kanlaya Naruedomkul, and Nick Cercone. "i-Math: Automatic math reader for Thai blind and visually impaired students." Computers & Mathematics with Applications 64.6 (2012): 2128-2140. (Year: 2012).*

* cited by examiner

FIG. 7

| Number | Operator | Natural Language | Translation Examples |
|---|---|---|---|
| 1 | log | power | $\log_3 50$ = what power of 3 is 50? |
| 2 | $\sqrt{\phantom{x}}$ | square | $^2\sqrt{16}$ = square of what is 16? |
| 3 | arcsin | sin | arcsin(½) = sin of what is ½? |
| 4 | cosin | sin | cosin(30°) = what is sin of co angle of 30°? |
| 5 | $\int$ | differential | $\int x^2 dx$ = what differential produces x^2? |
| 6 | $\frac{y}{x}$ | times | $\frac{12}{3}$ = What times of 3 is 12? |

MATHEMATICAL TRANSLATOR, A MATHEMATICAL TRANSLATION DEVICE AND A MATHEMATICAL TRANSLATION PLATFORM

BACKGROUND

Usually, a person spends countless hours in studying mathematics and using mathematics to solve problems until he graduates from elementary school, junior high school, high school, and college. However, most people merely memorize mathematical operators and apply them to the problems rather than grasping exactly what each mathematical operator means. After some hours, they forget what they memorized and do not use what they studied and learned for a long time in their daily life.

Thus, the ability to use mathematics in comparison to the time that most people invest in mathematics is at a low level, which makes the time spent in studying mathematics wasted. In addition, even those who have studied and learned mathematics well don't remember even the basic knowledge of mathematics after a certain period. Thus, the effectiveness of mathematics education is questionable in many cases. This phenomenon is caused by the fact that the study of mathematics is too difficult and that there is a great gap between real life and mathematics resulting from not utilizing mathematics in real life.

When a student who wants to study mathematics does not know the exact meaning of mathematical operators and simply starts to study mathematics with memorizing mathematical formula, the study of mathematics will soon become tedious and difficult. Therefore, it is necessary to approach mathematics like acquiring a language, not studying mathematics. In other words, if students can share the principles of mathematics with each other in a manner similar to daily conversations about sports when they communicate with each other about mathematical principles or when they talk about everyday life or the principles of mathematics or science, it will be much more effective than the existing learning method and will be used for a long time after acquiring the knowledge.

Accordingly, the present invention provides a technique for interpreting mathematics as a natural language and allowing it to be accepted as a kind of language such as a conversation in daily life. In other words, a mathematical translator that allows mathematical expressions including certain mathematical operators to be described in a natural language so that they can be described and explained at the level of natural language for everyday conversations rather than requiring complex calculations and high intelligence levels will be provided.

First of all, the prior arts in the domestic and foreign countries known before the application of the present invention in relation to translation tools for mathematical expressions including mathematical operators will be examined as follows.

U.S. Pat. No. 7,373,291 (May 13, 2008) relates to linguistic support for mathematical expression recognizers and presents a new source of information and a linguistic model to improve the accuracy of mathematical perception. In particular, this prior art extends the linguistic model to a mathematical domain and suggests a method of recognizing the artificial language of mathematics in a way related to a natural language recognition. Therefore, this prior art relates to pattern recognition, in particular, mathematical expression recognition.

On the other hand, the present invention does not simply recognize the mathematical expression but translates the meaning of the mathematical expression into a natural language so that the user can understand the meaning of the mathematical expression only by listening to it. That is, according to the present invention, recognizing the mathematical expression is a basic function and it expresses the meaning of the operator used in the mathematical expression in a natural language and interprets what the mathematical expression means.

U.S. Patent Publication No. 2015-0363390 (Dec. 17, 2015) describes a method for solving and responding to arithmetic and algebraic problems through natural language processing. It receives an input statement associated with an arithmetic or algebraic problem and determines whether each sentence in the plurality of sentences associated with the input statement is a qualified sentence from a mathematical point of view and translates each qualified sentence into a mathematical equation and narrates the mathematical result in a natural language.

The prior art includes solving arithmetic and algebraic problems and outputting the results by narration. However, the present invention is characterized by translating the meaning of the mathematical operator into a natural language and translating the meaning of the expression provided by the user into a natural language. That is, the present invention does not solve the mathematical equations and provide the results, but rather receives mathematical expressions including mathematical operators and outputs the mathematical meaning of them in a natural language. Thereby, they differ in purpose, structure, and effect.

As described above, most of the prior arts disclosed before filing of the present invention aimed to solve mathematical problems and provide the results. But the present invention is not intended to output a mathematical solution but to express the meaning of an input mathematical expression in a natural language and thereby to cultivate the ability of the user to intuitively explain the meaning of the mathematical expression by a linguistic means.

In order to achieve the above objectives, the present invention provides a method and a device for recognizing an input mathematical expression and translating the recognized mathematical expression into a natural language, and outputting a result of the translation as a voice or a text and allowing users to more intuitively understand the meaning of the mathematical expression and develop their ability to explain it verbally.

SUMMARY

The present invention has been made in order to solve the above problems and it is an objective of the present invention to allow a user to express mathematical operators and symbols in a natural language by interpreting and outputting the meaning of mathematical expressions as natural words.

It is another objective of the present invention to allow a user to intuitively understand a mathematical operator or a symbol by interpreting the meaning of a mathematical expression composed of a mathematical operator or a symbol as a natural language and outputting it as text, voice, image or the combinations thereof.

It is another objective of the present invention to provide a mathematical translator capable of outputting a translation in a corresponding natural language even if any mathematical expression is inputted by providing a database table having a meaning of a mathematical operator or a symbol.

It is another objective of the present invention to provide a database expressing meanings of various mathematical operators and symbols varied according to their usage as a natural language and storing them.

It is another objective of the present invention to provide an application program for outputting a translation of a meaning of a mathematical expression corresponding to a user input, a device for executing the application program, a learning tool, a game tool or contents.

According to a feature of the present invention to achieve the objectives described as above, a mathematical translator is configured to comprise: recognizing an operator and a parameter from a sentence or an image containing a mathematical expression, translating and outputting a meaning of the mathematical expression containing the recognized operator and parameter, and providing the translation of the mathematical expression by translating the relationship between the parameter and the operator in a natural language and outputting the translated result in the natural language.

The mathematical translator is configured to further comprise: recognizing the mathematical expression inputted from the image or an editor, extracting the parameter and the operator from the recognized mathematical expression, and interpreting the meaning of the mathematical expression based on an arrangement of the parameter and the operator.

The mathematical translator is configured to further comprise: recognizing a configuration of the mathematical expression and generating a data structure based on the recognized configuration, wherein the data structure comprises at least one or more than one parameter field, at least one or more than one operator field and a meaning field corresponding to the operator.

The mathematical translator is configured to further comprise: extracting a meaning of the operator in the data structure from a mathematical operator library database; and assigning the extracted meaning to the meaning field of the data structure and generating a translated data structure.

The mathematical translator is configured to further comprise: constructing the translation based on the translated data structure; and outputting the translation in a form expressed with sound, image, text or the combinations thereof based on the constructed translation.

According to another feature of the present invention to achieve the objectives described as above, a mathematical translation platform, is configured to comprise: recognizing an operator and a parameter from a sentence or an image containing a mathematical expression, translating a meaning of the mathematical expression containing the recognized operator and the parameter in a natural language and outputting the translated meaning, and providing a development environment to develop a mathematical translation service program through an application program interface.

According to another feature of the present invention to achieve the objectives described as above, a mathematical translation method recognizing an operator and a parameter from a sentence or an image containing a mathematical expression, translating a meaning of the mathematical expression containing the recognized operator and the parameter in a natural language, outputting the translated result in the natural language through a user interface, and providing the translation of the mathematical expression by translating the relationship between the parameter and the operator in a natural language and outputting the translated result in the natural language.

According to another feature of the present invention to achieve the objectives described as above, a method for providing a mathematical translation platform comprises: recognizing an operator and a parameter from a sentence or an image containing a mathematical expression, translating a meaning of the mathematical expression containing the recognized operator and the parameter in a natural language, outputting the translated result in the natural language through a user interface, and providing a development environment to develop a mathematical translation service program through an application program interface.

As described above, the present invention relates to a mathematical translator, a mathematical translation device, and the platform for mathematical translation, and it translates the meanings of inputted mathematical expression into a natural language, and that is, disentangles to explain mathematical meaning as a natural language, thereby it is effective for a user to understand mathematical operators or symbols intuitively by interpreting the meaning of mathematical expression comprising mathematical operators and symbols into an natural language and outputting them into text, voice, image or the combinations thereof.

Moreover, the present invention establishes a database storing the meanings of the mathematical operators and symbols and describing the changed meanings according to their usages into a natural language, provides a platform accessing the mathematical translator and the database, and thereby it is effective for a user to develop a variety of educational contents and game contents by providing a mathematical translator.

BRIEF DESCRIPTION OF THE DRAWINGS

For more complete understanding of this disclosure, reference is now made to the following brief description, taken in connection with the accompanying drawings and detailed description.

FIG. 7 illustrates examples of mathematical operators used in the mathematical translator according to an embodiment of the present invention, corresponding natural languages and translated texts using the mathematical operators.

DETAILED DESCRIPTION

Figure 1:
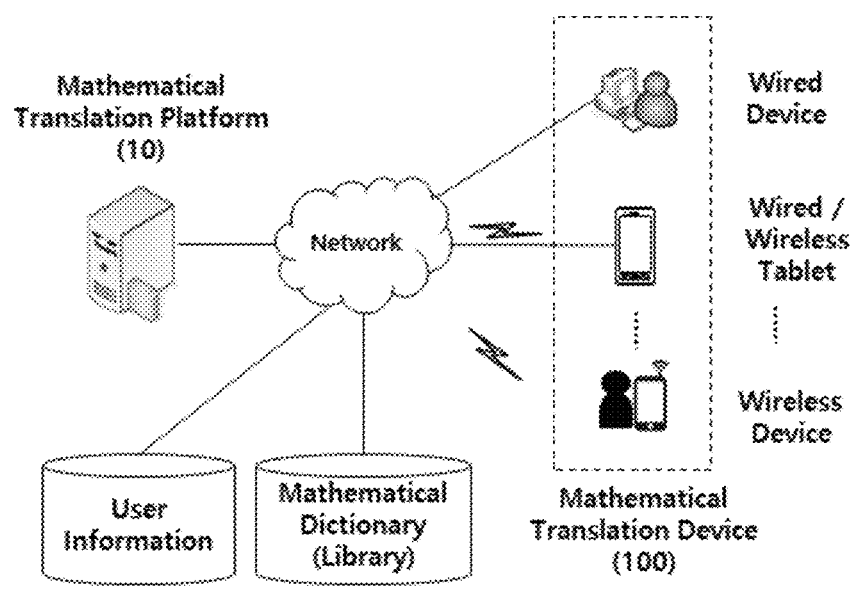
FIG. 1 is a diagram illustrating an example in which a mathematical translation platform having a mathematical translator and a mathematical translation device according to an embodiment of the present invention are connected to a communication network to provide a service.

Hereinafter, preferred embodiments of the present invention will be described in detail with reference to the accompanying drawings. Like reference symbols in the drawings denote like elements. Also, specific structural and functional descriptions for embodiments of the present invention are presented for purposes of describing embodiments of the present invention only, and unless otherwise defined, all terms used herein, including technical or scientific terms have the same meaning as commonly understood by those of ordinary skill in the art to which the present invention belongs.

FIG. 1 is a diagram illustrating an example in which a mathematical translation platform having a mathematical translator and a mathematical translation device according to an embodiment of the present invention are connected to a communication network to provide a service.

As shown in FIG. 1, the mathematical translation platform 10 and the mathematical translation device 100 using the mathematical translator according to an embodiment of the present invention may be connected to each other through a communication network. The mathematical dictionary (library) also stores various mathematical operators, meanings of each operator, translation rules and a mapping table between them.

In the present invention, the term mathematical operator may be used in the sense of mathematical terms, operators, and the like.

The mathematical translation platform 10 comprises a mathematical translator according to the present invention. If an application program interface (API) is given to provide various services using a mathematical translator, each service developer can develop a desired service using the API. For example, each developer can develop an application for math lessons. Materials or programs for teaching mathematics can be organized according to the level of the learner through the API for mathematical translation provided by the mathematical translation platform of the present invention. Each data or program can be configured using an API provided by the mathematical translation platform 10 according to the idea of the developer.

The mathematical translation platform 10 contains user information including developer information and learner information and collects and provides statistical information of each user. For example, it collects, analyzes and provides statistical information of each user for each service provided by the mathematical translation platform. By being provided statistical information on how many learners a specific service developer has provided his developed program over how much time to, other developers and learners can use it to develop better services or reference them to learning.

User information includes the number of learners, the type and style of programs provided by a specific learning program provider, temporal information (seasonal, monthly, time-based, etc.), spatial information (where, which organization used, etc.) and tendency (gender, workers, housewives, students, etc.) and is stored to be able to identify trends in time for learning program providers and learners. It is analyzed and the result may be stored in the storage of a network. Of course, storage media for storing user information includes local memory, removable storage, network storage, and databases on the cloud.

The mathematical dictionary (library) first stores mathematical operators and meanings (natural language). If there is a relationship between mathematical operators, it stores the relevance and a change of meaning determined by the relationship between a parameter and the mathematical operator. It also contains mapping tables for mathematical operators and corresponding natural language meanings.

The mathematical translator may be provided independently of the mathematical translation platform 10 or the mathematical translation device 100. A mathematical translator provided in a terminal such as a wired/wireless device and a tablet may transmit a mathematical expression to a mathematical translation platform and only display the results. Accordingly, the mathematical translation device may have a mathematical translator itself, but it may be connected to the mathematical translation platform via a network to request the function of the mathematical translator and receive the result. In addition, the mathematical translation platform 10 or the mathematical translation device 100 may have its own mathematical dictionary, but it may have a mathematical dictionary on the cloud of the network to fetch, transfer or store necessary information.

Figure 2:
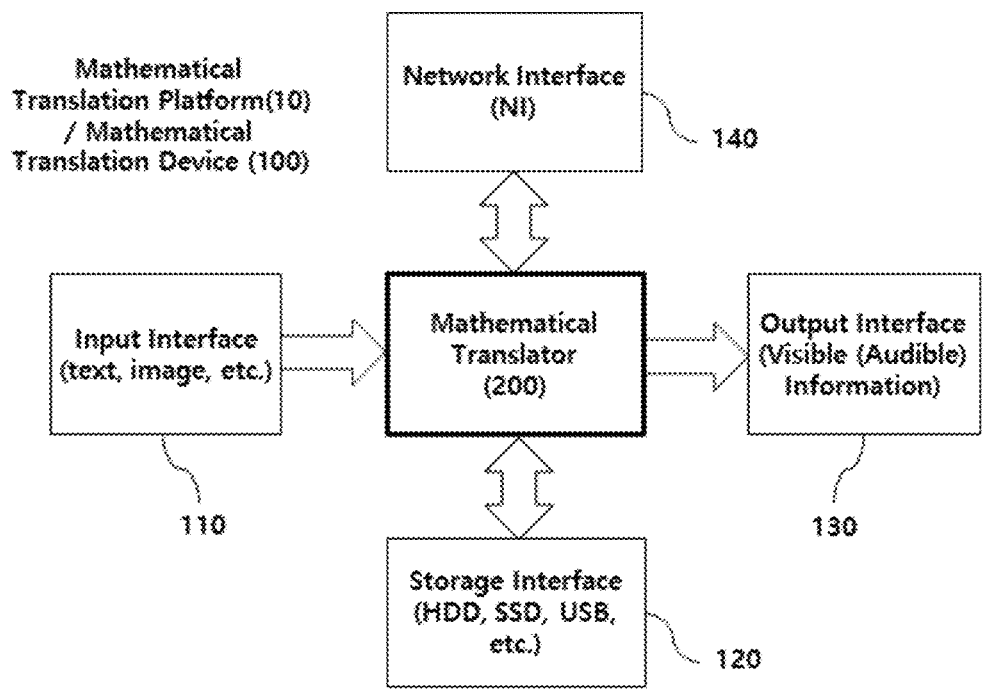
FIG. 2 is a block diagram illustrating an internal structure of a mathematical translation platform and a mathematical translation device having a mathematical translator according to an embodiment of the present invention.

FIG. 2 is a block diagram illustrating an internal structure of a mathematical translation platform and a mathematical translation device having a mathematical translator according to an embodiment of the present invention.

As shown in FIG. 2, the mathematical translation platform 10 or the mathematical translation device 100 has the mathematical translator as an engine and it is configured to have a network, an input/output and a storage device.

The network interface 140 refers to various types of wired and wireless network interfaces required for the mathematical translation platform 10 or the mathematical translation device 100 to access the network. Therefore, the specific function of the mathematical translator may be implemented in another device or a platform server on the network through the wired/wireless network interface.

The input interface 110 refers to an interface for reading a mathematical expression and is capable of inputting images, text input, voice or gesture input. There is no limitation on the input method. A user may enter his desired mathematical expression via the device. For example, a specific mathematical expression may be expressed as text.

In addition, the output interface 130 translates and outputs the input mathematical expression as a natural language. However, there is no limitation in the form of the result like text, image, visible information, audible information, braille information and sensory information. It is enough for the mathematical expression to be translated in the form. In particular, a person with a visual disability may be able to hear it and visual information may be output if there is a handicap in the hearing.

Meanwhile, the storage interface 120 is an interface for storing or reading information in a database storing mathematical operators, meanings of mathematical operators, and the like. The database may be HDD, SSD, USB, etc. When a database existing in the network cloud is used in particular, the database is accessed via the network interface.

The mathematical translation platform 10 is a platform for allowing a service developer to develop a desired service using the mathematical translator 200 and to provide the service to users to generate a profit. On the other hand, the mathematical translation device 100 installs a mathematical translator 200 application on a PC, a tablet, a mobile terminal, etc. and executes the mathematical translator by running the application so that a user can perform a mathematical learning or teaching. Also, the mathematical translation device 100 refers to a device using a user terminal that utilizes a mathematical translator by downloading various applications using the mathematical translator from the mathematical translation platform 10 and executing the application. In addition, a mathematical translation platform 10 may be provided by installing and operating software that plays a role of the mathematical translation platform 10 in a specific user terminal.

Figure 3:
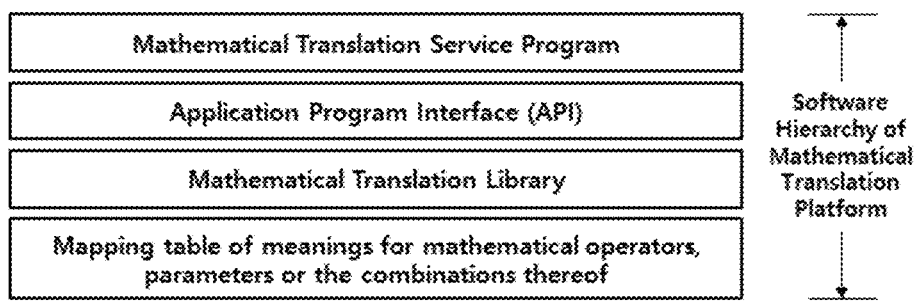
FIG. 3 is an exemplary diagram illustrating a hierarchical structure of software steps for providing a mathematical translation service in a mathematical translation platform having a mathematical translator according to an embodiment of the present invention.

FIG. 3 is an exemplary diagram illustrating a hierarchical structure of software steps for providing a mathematical translation service in a mathematical translation platform having a mathematical translator according to an embodiment of the present invention.

As shown in FIG. 3, the mathematical translation platform 10 accesses a mapping table for the meaning of (mathematical) operators, parameters, or combinations thereof extracted from the mathematical expressions entered and performs translations of mathematical expressions including parameters and mathematical operators by operating the mathematical translation library for each mathematical translation query and runs the mathematical translation service program using the result of executing a plurality of libraries through API.

In accordance with various mathematical translation service programs, mathematical translations requested from a plurality of devices are processed in parallel and provide processing results in real time. To this end, the remote device interfaces with the mathematical translation platform according to the present invention through a REpresentational State Transfer (REST) architecture. In other words, an interface is provided to transmit data on the web without a separate transport layer such as session tracking. The mathematical translation platform and the individual mathematical translation devices are separated as a uniform interface in which a client is separated from a server. Therefore, the uniform interface allows servers and clients to evolve independently and simplifies the server-client structure and separates them from each other.

Hereinafter, with reference to FIG. 4 and FIG. 5, two types of mathematical translator 200 will be described.

Figure 4:
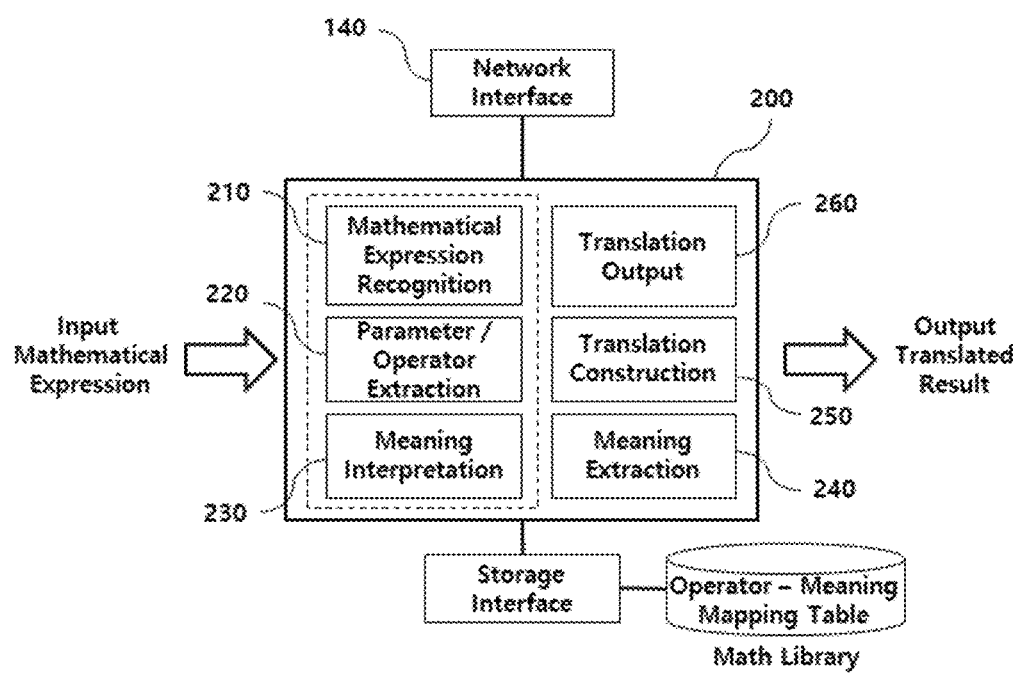
FIG. 4 and FIG. 5 are block diagrams illustrating an internal structure of a mathematical translator according to an embodiment of the present invention.
Figure 5:
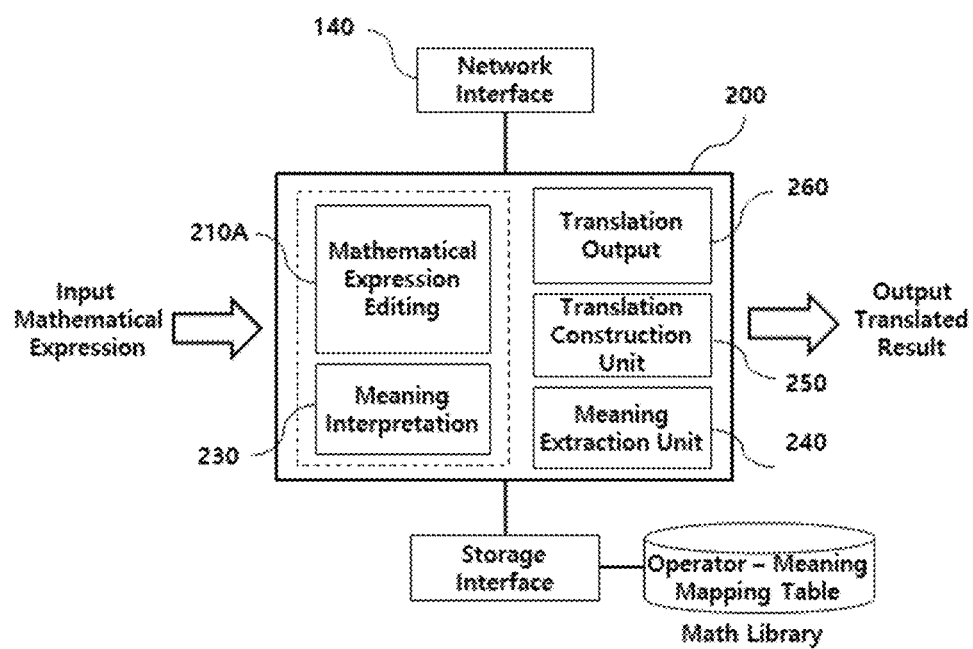

FIG. 4 and FIG. 5 are block diagrams illustrating an internal structure of a mathematical translator according to an embodiment of the present invention.

As shown in FIG. 4, the mathematical translator 200 according to an exemplary embodiment of the present invention includes a mathematical expression recognition unit 210 for recognizing a mathematical expression from an input mathematical expression, an parameter/operator extraction unit 220 for extracting an parameter and an operator from the recognized mathematical expression, a meaning interpretation unit 230 for interpreting meanings from an arrangement of the extracted parameters and operators, a meaning extraction unit 240 for extracting a meaning for the extracted operator, a translation construction unit 250 for constructing a translation by substituting meanings for the extracted operator according to the interpreted meanings and a translation output unit 260 for outputting the constructed translation according to a user's request.

The mathematical expression recognition unit 210 recognizes a mathematical expression from an inputted mathematical expression and should recognize and extract the mathematical expression in an image or a text because the inputted mathematical expression may be included in the image or the text. For this purpose, it is required for a character recognition program or a program that extracts only mathematical expressions in sentences to be included. Such a program can identify mathematical expressions inputted by the user automatically and accept them as inputs by matching and recognizing the pattern for the mathematical operators and parameters.

The parameter/operator extraction unit 220 performs a function of extracting a parameter and an operator from the recognized and extracted expression. It includes identifying and extracting information about an arrangement of parameters and operators as well as identifying parameters and operators.

The meaning interpretation unit 230 interprets the meanings of the expression based on the arrangement of the extracted parameters and operators. In other words, it assigns them to the corresponding data structure so that the arrangement of parameters and operators is derived and the meaning of the expression can be understood as a single statement. At this time, the specific data structure is determined by the operator. Only the front and back parameters are changed and when a parameter is added around the operator, the translation of the mathematical expression is derived.

The meaning extraction unit 240 reads the meaning of the corresponding operator from the database using the extracted operator. At this time, a specific operator may have different meanings depending on the nature (subscript or parentheses) of the parameters before and after the operator. Therefore, it is necessary to read the meaning of the operator in view of this.

The translation construction unit 250 substitutes the meaning of the extracted operator according to the meaning of the interpreted mathematical expression to form a translation. This is a process of creating a sentence by substituting a natural language implied by an operator for the operator in the data structure.

The translation output unit 260 replaces the sentences of the created translation with voice, image, braille, text, and the like and outputs them. The representation of the translation is output from each device as a translation result according to the user's request.

In one embodiment of the present invention, the mathematical translator 200 may be implemented as one or more processes in one processor and may perform the functions of the units described above. However, a very complicated process is required in order to recognize mathematical expressions in images or sentences. That is, extracting an operator from a handwritten character for a specific expression requires a complicated processing procedure because it is necessary to compare and extract the pattern of an operator recognizing the pattern from the image.

Therefore, in the case where the mathematical expression editing unit 210A is provided as shown in FIG. 5, when the user inputs the mathematical expression using the mathematical expression editor, a mathematical expression can be recognized immediately without requiring a separate mathematical expression recognition unit since the operators used in the mathematical expressions are already known.

If the mathematical expression is configured by selecting a mathematical operator in a general text editor so that an operator of the mathematical expression can be input with a separate editor, the mathematical expression editing unit 210A stores the ID of the operator used in the mathematical expression in the corresponding string and can recognize the operator immediately when matching the corresponding ID and the operator without performing a separate recognition process. Therefore, if the mathematical expression editing unit 210A is provided, the mathematical expression can be easily entered by the user and more easily recognized. And the parameter/operator extraction unit 220 can directly extract parameters and operators from the expression input in the mathematical expression editing unit 210A, and interpret the meanings of the expression by the arrangement of them. Next, here is an example explaining how to interpret the meaning of mathematical expressions, extract the meanings of operators and construct translations in natural language according to the meanings of mathematical expressions.

First, the operator 'log' may be translated to indicate power in relation to the parameter. For example, in the case of log 350, the mathematical expression recognition unit 210 or the mathematical expression editing unit 210A first reads the log 350 from input information and recognizes it as an expression requiring translation.

Here, the parameter/operator extraction unit 220 extracts parameters of 3 and 50 and at the same time the operator extraction unit 220 extracts the operator log. The meaning interpretation unit 230 interprets the meaning of the $\log_3(50)$ expression based on the arrangement of the parameters and the operators. In other words, it stores them in the predetermined data structure so that the arrangement of parameters and operators is derived and the meaning of the expression $\log_3(50)$ may be understood as a single statement. At this time, the operator is extracted and recognized in the specific data structure. The following parameters 3 and 50 are extracted and 3 is recognized as the base and 50 as the antilogarithm. The log is recognized as the operator and the antilogarithm (50), base (3), and operator (log) are assigned to the corresponding data structure when the base and antilogarithm are recognized as parameters in the log operator.

Figure 6:
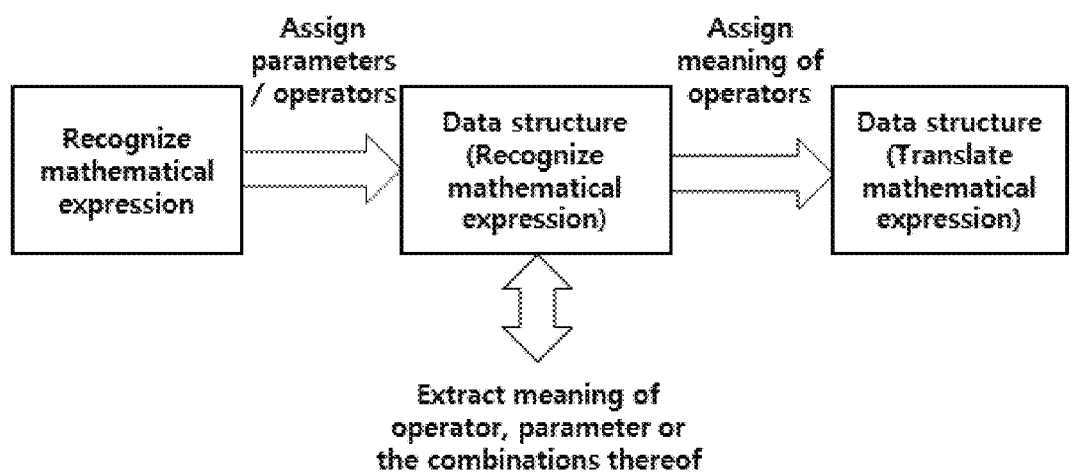
FIG. 6 is a schematic diagram illustrating a process of recognizing and translating a mathematical expression through a data structure in a mathematical translator according to an embodiment of the present invention.

FIG. 6 is a schematic diagram illustrating a process of recognizing and translating a mathematical expression through a data structure in a mathematical translator according to an embodiment of the present invention. As shown in FIG. 6, if the mathematical expression is recognized, a data structure is generated according to the mathematical expression and a parameter and an operator are assigned. And the meaning of the operator, the parameter or a combination thereof is extracted based on the recognized operator. The meaning of the extracted operator is input to the recognized data structure to extract the translated data structure. Using this data structure, the translated result can be expressed and output.

In the present invention, the technical features have been described using the data structure. However, if the input and output conditions are the same as those claimed in the present invention, the mathematical expression can be recognized and translated using other methods than the data structure. However, if only the input/output conditions are the same, it is reasonable to fall within the technical scope of the present invention.

Here, the data structure may be defined as having a frame for one data structure for each operator and each frame has at least one field and has a data structure for the operator. Information about operators and parameters is necessary for the translation of mathematical expressions. If the meaning of the corresponding operator is extracted and assigned to the data structure, a data structure for translating a mathematical expression is generated.

The meaning extraction unit 240 extracts the meaning of natural language corresponding to the operator (log) stored in the mathematical library with respect to the assigned operator (log). Since the meaning of natural language of log is 'power', it extracts power. And then the extracted meaning is assigned to the data structure. The meaning interpretation unit 230 interprets the result of the query for the translation of a mathematical expression by the user and constructs a data structure. Then, the meaning extraction unit extracts the natural language meaning of the operator. And the translation construction unit assigns the extracted natural language meaning to the data structure to construct a translation.

For example, in a case of log 5x=3, what power of 5 is x? The answer is that x is 5 of power 3. Again, x becomes 5^3, so x can be solved only by the meaning of natural language. Thus, the present invention is a very useful system for obtaining a solution of an equation. At last, the translation construction unit 250 constructs the expression $\log_3(50)$ as a translation "50 is 3 of what power". Next, the translation output unit 260 expresses it as the translation of "What of power of 3 is 50?" and substitutes x for $\log_3(50)$ and expresses it as "50 is 3 of power x". Again, it substitutes $\log_3(50)$ for x and expresses it as "50 is 3 of power $\log_3(50)$" and may equivalently express it as "50=3^x" or "50=3^($\log_3(50)$)". These expressions may be converted into images containing graphics so that they can be easily understood by the user and may be expressed by text or voice.

Also, in the case of $$\sqrt[2]{16}$$

it can be expressed as "The square of what is 16?" Also, it can be translated as "the square of "

$$\sqrt[2]{16}$$

is 16", which means $$(\sqrt[2]{16})\wedge 2 = 16.$$

On the other hand, in $$\sqrt[2]{16} = x,$$

expression becomes simple. In other words, a translation of "The square of what is 16?" or "the square of x is 16" may be output and it may be expressed as x^2=16. It is possible to generalize a square root or cubic root to n square root.

And for the $$\sqrt[2]{-1},$$

it may be substituted by a translation "The square of what is −1?" and it may be translated into "the square of $$\sqrt[2]{-1} \text{ is } -1",$$

which means $$(\sqrt[2]{-1})\wedge 2 = -1.$$

On the other hand, in $$\sqrt[2]{-1} = x,$$

expression becomes simple. That is, for the translation of "The square of what is −1", the expression "the square of x is −1" is also possible, which may be expressed as x ^2=−1. Where X is the complex number i. Also, in the case of arcsin (½), it can be expressed as "sin of what is ½", which is expressed as "sin of arcsin (½) is ½". This means sin (arcsin (½))=½. On the other hand, in arcsin(½)=x, expression becomes simple. That is, for the translation of "The sin of what is ½", the expression "the sin of x is ½" is possible, which may be expressed as sin(x)=½. Like arcsin, the same method may be applied to arccos, arctan, and so on.

In case of cosin (30°), this is translated to a cosine of 30°, which is again translated to sin of co angle of 30°. On the other hand, it may be translated to sin of 60° again. The way to read cosine, cotangent and cosecant etc. is to read them as sine of co, tangent of co and secant of co. Here, co is an abbreviation of complementary and means an angle that becomes 90 degrees when combined. For example, the co angle of 30 degrees is 60 degrees.

Also, in the case of ∫x²dx, the meaning may be interpreted with the translation "What is differentiated by x^2". This can be translated as "∫x²dx", which means $$\frac{d\left(\int x^2 dx\right)}{dx} = x^2.$$

This is precisely the derivation of an expression meaning that the integral implies the inverse of the differential. On the other hand, in ∫x²dx=f(x), expression becomes simple. In other words, the translation "what is differentiated by x^2?" and "x^2 is differentiated by f(x)" are derived, which means $$\frac{df(x)}{dx} = x^2.$$

When differentiating f(x), x^2 is derived. So it is found that f(x) becomes (⅓)*(x^3)+c.

Next, for 12/3, for example, "What times of 3 is 12?" may be generated, which may again be derived as a translation "12 is 12/3 times of 3". In the end, the conclusion is that the desired answer is 12=3*(12/3). When substituting x for $$\frac{12}{3}$$

and answering for the translation "What times of 3 is 12?", "12 is x times of 3" is derived and it results in 12=3*x. Therefore, in the present invention, when the problem is read out, the answer is immediately derived, and such a reading process is explained in the process. In the above example, when reading 12=3*x, a sentence "What times of 3 is 12?" is derived and the answer that x is 12/3 is immediately derived. Similarly, when x/3=2 and the mathematical translator according to the present invention is used, x is 2 times of 3, so directly x=3*2. This mathematical translator is a very powerful tool in mathematics.

Also, for multiplication, ten(10)-ten(10) is interpreted as a hundred(100), ten(10)-hundred(100) is interpreted as a thousand(1,000), ten(10)-thousand(1,000) is interpreted as a ten thousand(10,000), ten thousand(10,000)-ten thousand (10,000) is interpreted as a billion(100,000,000), and ten thousand(10,000)-billion(100,000,000) is interpreted as a trillion. Therefore, 20,000×30,000=2*(ten thousand)*3*(ten thousand)=2*3*(ten thousand)*(ten thousand) is interpreted as 6 billion. Also, it is that (200,000)*(300 billion)= 2*(ten)*(ten thousand)*3*(hundred)*(billion)=2*3*(ten)* (hundred)*(ten thousand)*(billion)=6,000 trillion. It allows you to give an immediate answer when calculating the product of decimals. As in the above example, (20 thousand)*(30 thousand) may be represented as "2*(ten thousand)*3*(ten thousand). If greater parameters are sent back, it is (2)*(3)*(ten thousand)*(ten thousand). Here, the translator produces 6 billion.

On the other hand, 5^3 is translated to multiplying 5 by 3 and multiplying 1 with 5 three times produces the result. In other words, it is 1*5*5*5. 5^1 is 1*5. 5^0 means multiplying 5 by 0 times. That is, it means "do not multiply 5 even once", so 5^0 is 1. Here, the meaning of 3 is preserved correctly, so there are three multiplications and 1 is specified for the first multiplication. So, in the end, 5^0 can be explained accurately and this mathematical translator neatly solves many difficulties about exponents. In modern times, 0^0 is generally accepted as 1, but the present invention also serves as an accurate mathematical translator which can explain this.

Applying this principle to 8^(⅓), 8^(⅓) becomes 1*A (A is the number that becomes 8 by multiplying 3 times). This means A with A^3=8, and $$A = \sqrt[3]{8}.$$

Next, it will be explained what '−' means in −3. '−' has the meaning of 'opposition'. Therefore, −3 means three times in opposition. For example, 5^(−3) means multiplying 5 by −3, so it is equivalent to multiplying 5 by three times in opposition, which is the same as dividing 3 times. As a result, 5^(−3)=1÷5÷5÷5=1÷(5*5*5)=1÷(5^3)=1/(5^3). The meaning of −3 is interpreted as three times opposition and the meaning of −3 actually comes to alive as a positive number of three times. The role of 'opposition' is to turn multiplication into division.

On the other hand, the following is what the meaning of 'opposition' is more applied. In other words, if the meaning of −3*5 is interpreted, it means the same as adding 5 by −3 times, which means to add 5 by 3 times in opposition, which is equivalent to subtracting 5 by 3 times. Therefore, −3*5=0−5−5−5=0−(5+5+5)=0−3*5=−(3*5).

An example of a database entry for interpreting and translating a mathematical expression including a mathematical operator (mathematical term) in the mathematical translator presented in the present invention will be described below.

<LOG>
Meaning: what power
Number of parameters: 2
Format: LOG <Parameter2><Parameter1>
Parameter1(name: logarithm, role: result, interpretation postposition: ~is, ~are)
Parameter2(name: base, role: input, interpretation postposition: ~of)

Full translation: What power of parameter 2 is parameter 1?

Also, the effect of the mathematical translator of the present invention is to help solve the problem as a natural language through outputting the result of translating the provided mathematical expression.

At log 5x=3, this case is interpreted to "What power of 5 is x?" and the result is power 3. Once again, x becomes 5^3. In this way, only the meaning of natural language makes it possible to solve x. Thus, the present invention becomes a very useful system for solving an equation when a certain equation is given.

All other cases are interpreted and translated in the same way.

For arcsin (x)=30°, it is interpreted as sin of what is x, the result is 30°. If this is interpreted again, it is that sin of 30° is x. So it can be easily solved that sin (30°=x and x=½.

The following is a summary of the differences between mappings of operators and natural languages and general terms according to the present invention. That is, in the present invention, when translating the meaning of an operator into a natural language, it is mapped to a better language in explaining the mathematical meaning of the operator, not the intact meaning of the operator.

FIG. 7 illustrates examples of mathematical operators used in the mathematical translator according to an embodiment of the present invention, corresponding natural words and translated texts using the mathematical operators.

As shown in FIG. 7, log can be expressed as a power, root as a square, arcsin and cosin as sin, integral as a differential, and fraction as a multiple. By describing the difficult concepts in an easier and expressive form of expression, it is possible to make it easier for the user to access the mathematics. In FIG. 7, the meaning of mathematical operators, natural language and examples of translations applying them can be understood as translating difficult operators into easier concept operators. Multiples are easier to comprehend intuitively than division, and differentials are easier to understand than integral and sin is easier to understand than arcsin or cosin. It is also comfortable to understand the logarithm or the root as powers or squares.

Figure 8:
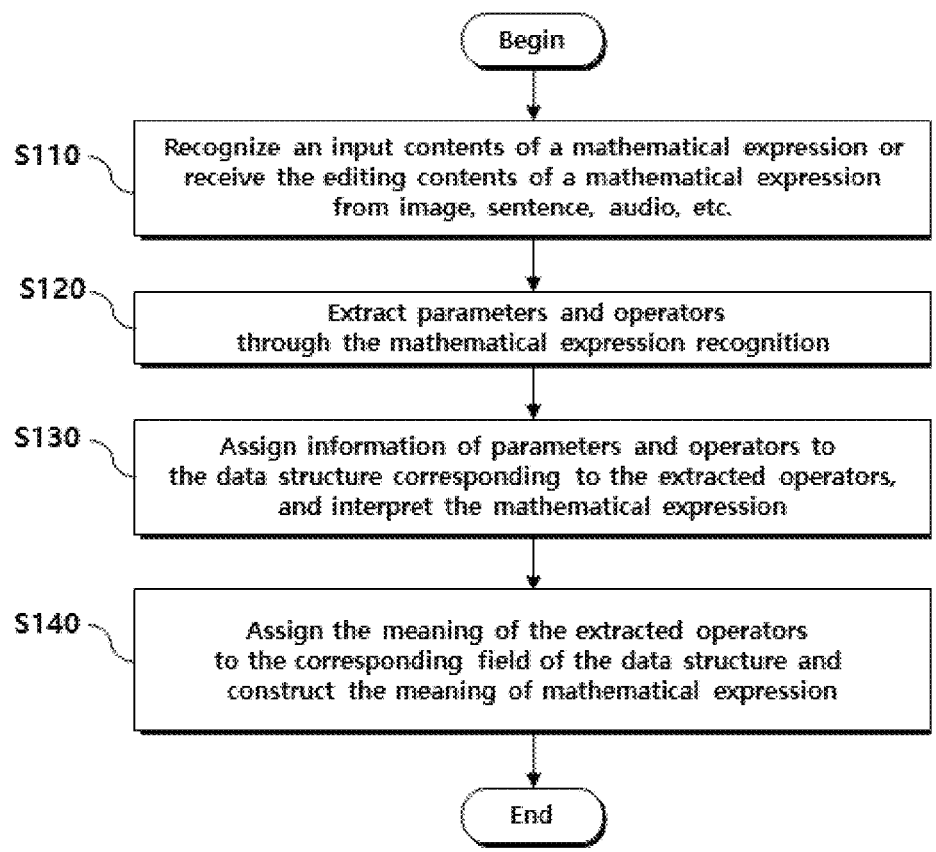
FIG. 8 is a flowchart illustrating an operation of the mathematical translator according to an embodiment of the present invention.

FIG. 8 is a flowchart illustrating an operation of the mathematical translator according to an embodiment of the present invention.

As shown in FIG. 8, the mathematical translator 200 according to an embodiment of the present invention first receives a mathematical expression through an input interface or a network interface. The inputted form may be an image, a sentence, an audio or the like, and a mathematical expression inputted by a text editor or handwriting may have a separate recognition program for the operator. If a mathematical expression editor is used, the editing contents of the mathematical expression are received through an editing tool or an interface (S110).

Then, the mathematical translator 200 extracts mathematical expressions from the images or sentences, recognizes the mathematical expressions through the parameter extractor, and extracts the operators from the operator extractor. When a separate mathematical editing unit 210A is used, parameters and operators are extracted as soon as the editing contents are input in the mathematical expression editor (S120).

Next, based on the extracted parameters and operators, the information for the parameters are assigned to the corresponding fields in the data structure. In the case of the operators, the operator names are assigned to the fields of the operators in the corresponding data structures. If the data structure in which the parameters and operators are allocated is created, the meaning of the mathematical expression is recognized or interpreted (S130). The meaning extraction unit 240 extracts the meaning of the operator extracted from the mathematical expression from the database. In this case, the natural term meaning of the operator should be extracted considering the arrangement of parameters placed before and after the operator.

The extracted meaning of the natural language is allocated to the meaning field of the data structure constructed in the meaning interpretation unit 230, and the whole meaning of the mathematical expression combining the natural language meaning of the corresponding operator and the parameter is constructed (S140).

As described above, the present invention relates to a mathematical translator, a mathematical translation device, and a platform for mathematical translation. When a specific mathematical expression is inputted, the meaning of the mathematical expression is interpreted as a natural language. By expressing mathematical meanings in a natural language, it interprets the meaning of mathematical expressions consisting of mathematical operators and symbols as natural words and outputs them as text, voice, or image so that users can intuitively understand mathematical operators and symbols.

In addition, the present invention establishes a database of the meanings of the mathematical operators and symbols in which the meanings of them are varied and expressed in a natural language according to the usage. It is possible to develop a variety of educational contents and game contents by providing a mathematical translator and a platform for accessing the database and developing an application program including a mathematical translator.

While the present invention has been particularly shown and described with reference to exemplary embodiments thereof, it is to be understood that the invention is not limited to the disclosed exemplary embodiments and each element of the present invention may be changed or modified within the technical scope of the present invention to achieve the same object and effect.

Moreover, while the present invention has been particularly shown and described with reference to exemplary embodiments thereof, it is clearly understood that the same is by way of illustration and example only and is not to be taken in conjunction with the present invention. It will be understood by those skilled in the art that various changes and modifications may be made by those skilled in the art without departing from the spirit and scope of the present invention. These modifications should not be understood individually from the technical idea or viewpoint of the present invention.

What is claimed is:

1. A mathematical translator for a mathematical expression, the mathematical translator comprising at least one processor to implement:
   a recognition unit configured to recognize the mathematical expression that comprises an operator and a parameter from at least one of image, text, audio, and gesture input through an input interface;
   a parameter/operator extraction unit configured to extract the parameter and the operator from the recognized mathematical expression;
   a meaning interpretation unit configured to interpret a meaning of the recognized mathematical expression from an arrangement of the extracted parameter and the extracted operator;

a meaning extraction unit configured to extract a predetermined meaning of the extracted operator stored in a mathematical operator library database, the predetermined meaning of the extracted operator being different from the extracted operator and the predetermined meaning of the extracted operator indicating an inverse relationship with the extracted operator;

a translation construction unit configured to create a translation by substituting the predetermined meaning of the extracted operator for the extracted operator based on the interpreted meaning; and a translation output unit configured to output the translation of the meaning of the mathematical expression in a natural language through an output interface by replacing the created translation with voice, image, braille, text, or combinations thereof, wherein the mathematical translator is provided by a mathematical translation platform or a mathematical translation device comprising at least one of a wired device, a wireless device, a wired tablet, a wireless tablet, which is connected to the mathematical operator library database through at least one of a network storage, a removable storage, a local memory, and a cloud database, and wherein the predetermined meaning of the extracted operator is extracted from the mathematical operator library database, which stores operators and predetermined meanings of the operators.

2. The mathematical translator of claim 1, wherein the recognition unit is further configured to recognize a configuration of the mathematical expression and generate a data structure based on the recognized configuration, wherein the data structure comprises at least one or more than one parameter field, at least one or more than one operator field and a meaning field corresponding to the operator.

3. The mathematical translator of claim 2, wherein the meaning extraction unit is further configured to:
assign the extracted predetermined meaning to the meaning field of the data structure; and
generate a translated data structure.

4. The mathematical translator of claim 3, wherein the translation construction unit is further configured to construct the translation based on the translated data structure.

5. A mathematical translation platform for a mathematical expression, the mathematical translation platform comprising at least one processor to implement:

a recognition unit configured to recognize the mathematical expression that comprises an operator and a parameter from at least one of image, text, audio, gesture input through an input interface;

a parameter/operator extraction unit configured to extract the parameter and the operator from the recognized mathematical expression;

a meaning interpretation unit configured to interpret a meaning of the recognized mathematical expression from an arrangement of the extracted parameter and the extracted operator;

a meaning extraction unit configured to extract a predetermined meaning of the extracted operator stored in a mathematical operator library database, the predetermined meaning of the extracted operator being different from the extracted operator and the predetermined meaning of the extracted operator indicating an inverse relationship with the extracted operator;

a translation construction unit configured to create a translation by substituting the predetermined meaning of the extracted operator for the extracted operator based on the interpreted meaning; and a translation output unit configured to output the translation of the meaning of the mathematical expression in a natural language through an output interface by replacing the created translation with voice, image, braille, text, or combinations thereof, wherein the mathematical translation platform configured to provide a development environment to develop a mathematical translation service program through an application program interface on a mathematical translation device comprising at least one of a wired device, a wireless device, a wired tablet, a wireless tablet, which are connected to the mathematical operator library database through at least one of a network storage, a removable storage, a local memory, and a cloud database, and wherein the predetermined meaning of the extracted operator is extracted from the mathematical operator library database, which stores operators, predetermined meanings of the operators.

6. A mathematical translation method for a mathematical expression, which comprises:

recognizing the mathematical expression that comprises an operator and a parameter from at least one of image, text, audio, gesture input through an input interface;

extracting the parameter and the operator from the recognized mathematical expression;

interpreting a meaning of the recognized mathematical expression from an arrangement of the extracted parameter and the extracted operator;

extracting a predetermined meaning of the extracted operator stored in a mathematical operator library database, the predetermined meaning of the extracted operator being different from the extracted operator and the predetermined meaning of the extracted operator indicating an inverse relationship with the extracted operator;

creating a translation by substituting the predetermined meaning of the extracted operator for the extracted operator based on the interpreted meaning; and outputting the translated meaning of the mathematical expression in a natural language through an output interface by replacing the created translation with voice, image, braille, text, or combinations thereof, wherein the mathematical translation method is provided by a mathematical translation platform or a mathematical translation device comprising at least one of a wired device, a wireless device, a wired tablet, a wireless tablet, which are connected to the mathematical operator library database through at least one of a network storage, a removable storage, a local memory, and a cloud database, and wherein the predetermined meaning of the extracted operator is extracted from the mathematical operator library database, which stores operators, predetermined meanings of the operators.

7. The method of claim 6, which further comprises:
recognizing a configuration of the mathematical expression and generating a data structure based on the recognized configuration, wherein the data structure comprises at least
one or more than one parameter field, at least one or more than one operator field and a meaning field corresponding to the operator.

8. The method of claim 7, which further comprises:
assigning the extracted predetermined meaning to the meaning field of the data structure and generating a translated data structure.

9. The method of claim 8, which further comprises:
constructing the translation based on the translated data structure.

10. A method for providing a mathematical translation platform, which comprises:
recognizing a mathematical expression that comprises an operator and a parameter from at least one of image, text, audio, gesture input through an input interface;
extracting the parameter and the operator from the recognized mathematical expression;
interpreting a meaning of the recognized mathematical expression from an arrangement of the extracted parameter and the extracted operator;
extracting a predetermined meaning of the extracted operator stored in a mathematical operator library database, the predetermined meaning of the extracted operator being different from the extracted operator and the predetermined meaning of the extracted operator indicating an inverse relationship with the extracted operator;
creating a translation by substituting the predetermined meaning of the extracted operator for the extracted operator based on the interpreted meaning;
outputting the translated meaning of the mathematical expression in a natural language through an output interface by replacing the created translation with voice, image, braille, text, or combinations thereof; and
providing a development environment to develop a mathematical translation service program through an application program interface on a mathematical translation device comprising at least one of a wired device, a wireless device, a wired tablet, a wireless tablet, which are connected to the mathematical operator library database through at least one of a network storage, a removable storage, a local memory, and a cloud database,
wherein the predetermined meaning of the extracted operator is extracted from the mathematical operator library database, which stores operators, predetermined meanings of the operators.

* * * * *